United States Patent
Steinbaeck et al.

(10) Patent No.: US 11,879,993 B2
(45) Date of Patent: Jan. 23, 2024

(54) TIME OF FLIGHT SENSOR MODULE, METHOD, APPARATUS AND COMPUTER PROGRAM FOR DETERMINING DISTANCE INFORMATION BASED ON TIME OF FLIGHT SENSOR DATA

(71) Applicant: Infineon Technologies AG, Neubiberg (DE)

(72) Inventors: Josef Steinbaeck, Graz (AT); Hannes Plank, Graz (AT); Armin Schoenlieb, Seiersberg-Pirka (AT)

(73) Assignee: Infineon Technologies AG, Neubiberg (DE)

( * ) Notice: Subject to any disclaimer, the term of this patent is extended or adjusted under 35 U.S.C. 154(b) by 760 days.

(21) Appl. No.: 16/705,832

(22) Filed: Dec. 6, 2019

(65) Prior Publication Data

US 2020/0182971 A1 Jun. 11, 2020

(30) Foreign Application Priority Data

Dec. 7, 2018 (EP) .................................... 18211157

(51) Int. Cl.
*G01S 7/48* (2006.01)
*G01S 17/08* (2006.01)

(52) U.S. Cl.
CPC ............ *G01S 7/4808* (2013.01); *G01S 17/08* (2013.01)

(58) Field of Classification Search
None
See application file for complete search history.

(56) References Cited

U.S. PATENT DOCUMENTS

| 6,753,876 B2 | 6/2004 | Brooksby et al. |
| 9,628,774 B2* | 4/2017 | Kang .................... H04N 13/204 |
| 10,964,032 B2* | 3/2021 | Sjoberg .................... G06T 7/246 |
| 2011/0149071 A1* | 6/2011 | Oggier .................. G01S 17/894 |
| | | 348/140 |
| 2018/0211398 A1 | 7/2018 | Schmidt |
| 2019/0087978 A1* | 3/2019 | Tourapis .................... G06T 9/00 |
| 2019/0129034 A1 | 5/2019 | Yoshida et al. |
| 2019/0138800 A1* | 5/2019 | Mimatsu .................... G06T 7/73 |
| 2020/0011972 A1* | 1/2020 | Masuda ................ G01S 17/894 |

FOREIGN PATENT DOCUMENTS

| CN | 101273624 A | 9/2008 |
| CN | 104838284 A | 8/2015 |
| CN | 107037443 A | 8/2017 |
| CN | 108307180 A | 7/2018 |

(Continued)

*Primary Examiner* — Stuart D Bennett
(74) *Attorney, Agent, or Firm* — Murphy, Bilak & Homiller, PLLC

(57) ABSTRACT

Examples relate to a method, an apparatus and a computer program for determining distance information based on Time of Flight (ToF) sensor data. The method includes obtaining the ToF sensor data, determining one or more saturated regions within the ToF sensor data, determining distance information for one or more boundary regions located adjacent to the one or more saturated regions based on the ToF sensor data, and determining distance information for at least a part of the one or more saturated regions based on the distance information of the one or more boundary regions.

20 Claims, 5 Drawing Sheets

(56) References Cited

FOREIGN PATENT DOCUMENTS

| | | | |
|---|---|---|---|
| CN | 108445500 | A | 8/2018 |
| EP | 2116864 | A1 | 11/2009 |
| EP | 2372389 | A1 | 10/2011 |
| WO | 2016156308 | A1 | 10/2016 |
| WO | 2017183114 | A1 | 10/2017 |
| WO | 2018101187 | A1 | 6/2018 |
| WO | 2018222120 | A1 | 12/2018 |

* cited by examiner

TIME OF FLIGHT SENSOR MODULE, METHOD, APPARATUS AND COMPUTER PROGRAM FOR DETERMINING DISTANCE INFORMATION BASED ON TIME OF FLIGHT SENSOR DATA

TECHNICAL FIELD

Examples relate to a Time of Flight sensor module and to a method, an apparatus and a computer program for determining distance information based on Time of Flight sensor data, more specifically, but not exclusively, to determining distance information for at least a part of one or more saturated regions based on distance information of boundary regions located adjacent to the saturated regions.

BACKGROUND

Time-of-flight (ToF) cameras are based on a measurement of a delay between the emission of an optical infra-red (IR) signal, which is then reflected by an object, and the reception of the optical signal at a photon mixing device (PMD) imager. The measured delay is proportional to the distance of the object. Not all of the reflections of the infra-red signal may be usable in the determination of the distance. Portions of the infra-red signal that are reflected by a highly reflective object or by an object that is located close to the time-of-flight camera may have an increased amplitude at the PMD imager. If the amplitude of these portions is too high, then saturated regions may occur within the ToF sensor data.

SUMMARY

Embodiments provide a method for determining distance information based on ToF sensor data. The method comprises obtaining the ToF sensor data. The method further comprises determining one or more saturated regions within the ToF sensor data. The method further comprises determining distance information for one or more boundary regions located adjacent to the one or more saturated regions based on the ToF sensor data. The method further comprises determining distance information for at least a part of the one or more saturated regions based on the distance information of the one or more boundary regions.

Embodiments provide a computer program product comprising a computer readable medium having computer readable program code embodied therein, the computer readable program code being configured to implement a method for determining distance information based on ToF sensor data when being loaded on a computer, a processor, or a programmable hardware component. The method comprises obtaining the ToF sensor data. The method further comprises determining one or more saturated regions within the ToF sensor data. The method further comprises determining distance information for one or more boundary regions located adjacent to the one or more saturated regions based on the ToF sensor data. The method further comprises determining distance information for at least a part of the one or more saturated regions based on the distance information of the one or more boundary regions.

Embodiments provide an apparatus for determining distance information based on ToF sensor data. The apparatus comprises an interface for obtaining the ToF sensor data. The apparatus comprises a computation module configured to determine one or more saturated regions within the ToF sensor data. The computation module is configured to determine distance information for one or more boundary regions located adjacent to the one or more saturated regions based on the ToF sensor data. The computation module is configured to determine distance information for at least a part of the one or more saturated regions based on the distance information of the one or more boundary regions.

Embodiments provide a Time of Flight (ToF) sensor module comprising a ToF sensor and an apparatus for determining distance information based on Time of Flight sensor data. The apparatus comprises an interface for obtaining the ToF sensor data. The ToF sensor is configured to provide the ToF sensor data. The apparatus comprises a computation module configured to obtain the ToF sensor data from the ToF sensor. The computation module is configured to determine one or more saturated regions within the ToF sensor data. The computation module is configured to determine distance information for one or more boundary regions located adjacent to the one or more saturated regions based on the ToF sensor data. The computation module is configured to determine distance information for at least a part of the one or more saturated regions based on the distance information of the one or more boundary regions.

BRIEF DESCRIPTION OF THE FIGURES

Some examples of apparatuses and/or methods will be described in the following by way of example only, and with reference to the accompanying figures, in which.

DETAILED DESCRIPTION

Figure 1A:
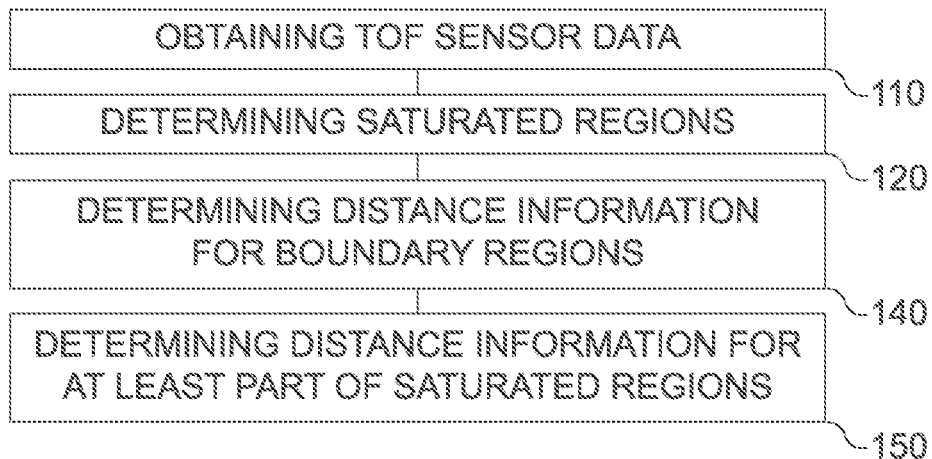
FIGS. 1a and 1b show flow charts of embodiments of a method for determining distance information based on Time of Flight sensor data.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

At least some embodiments relate to a determination of distance information based on Time of Flight (ToF) sensor data. In Time of Flight distance measurements, an optical signal (e.g. an infrared signal) may be emitted, reflected by one or more objects, and measured by a Time-of-Flight sensor comprising a photon mixing device imager. Based on a distance of the object reflecting the optical signal, a delay between the emission of the optical signal and the measurement of the optical signal by the ToF sensor may vary. A distance of the object to the sensor may be determined based on the delay between the emission of the optical signal and the measurement of the optical signal.

In some cases, the reflections caused by an object might not be useable for distance determination. For example, if the object is too close, or if it comprises a highly reflective surface, such as a reflector, may lead to the ToF sensor data comprising one or more saturated regions, for which a distance determination might not be inherently possible. At least some embodiments may circumvent this limitation by detecting the one or more saturated regions within the ToF sensor data. Within the ToF sensor data, boundary regions that are located adjacent to the one or more saturated regions may be caused by stray light (i.e. scattered light) being reflected by the objects that cause the one or more saturated regions. In the ToF sensor data, this stray light may lead to a corona that surrounds the one or more saturated regions, and which may be indicative of the distance of the objects to the ToF sensor. In embodiments, the distance information of the boundary regions may be determined, and based on the determined distance information of the boundary regions, which may surround the one or more saturated regions, all or part of the one or more saturated regions may be arbitrarily attributed distance information that is derived from the distance information determined for the adjacent boundary regions, e.g. based on an interpolation of the distance information of the adjacent boundary regions. After determining the distance information for the one or more saturated regions, the distance information for the boundary regions may be discarded, e.g. declared invalid or unreliable.

Figure 1B:
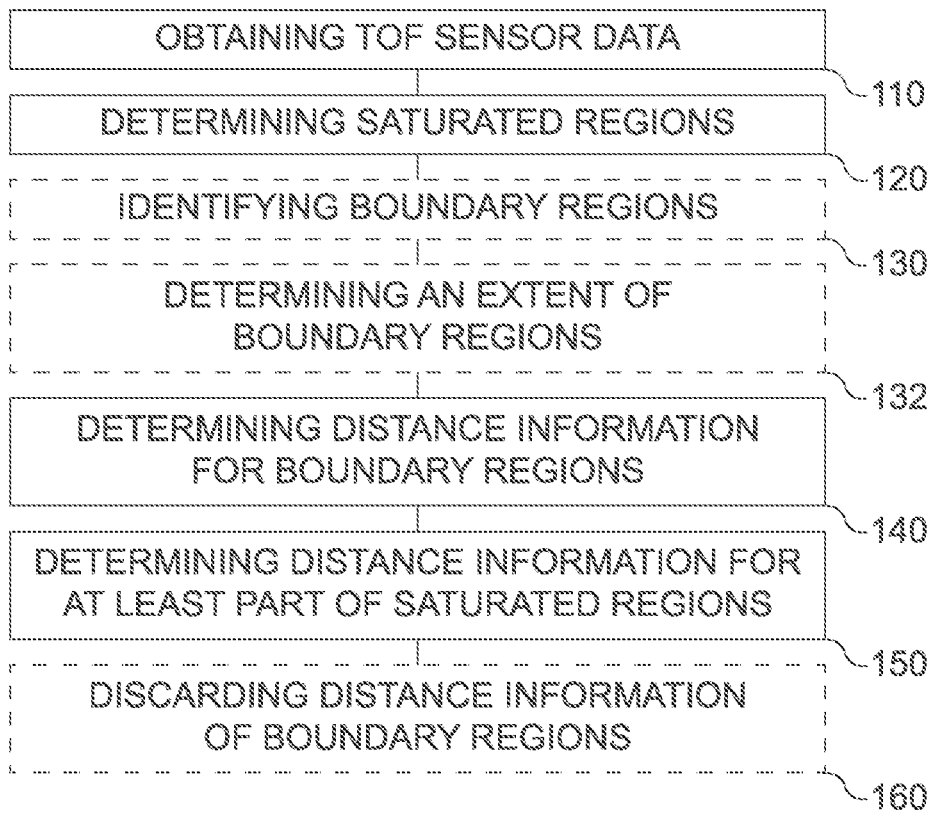

FIGS. 1a and 1b show flow charts of embodiments of a method for determining distance information based on Time of Flight (ToF) sensor data. The method comprises obtaining 110 the ToF sensor data. The method further comprises determining 120 one or more saturated regions within the ToF sensor data. The method further comprises determining 140 distance information for one or more boundary regions that are located adjacent to the one or more saturated regions based on the ToF sensor data. The method further comprises determining 150 distance information for at least a part of the one or more saturated regions based on the distance information of the one or more boundary regions.

Figure 1C:
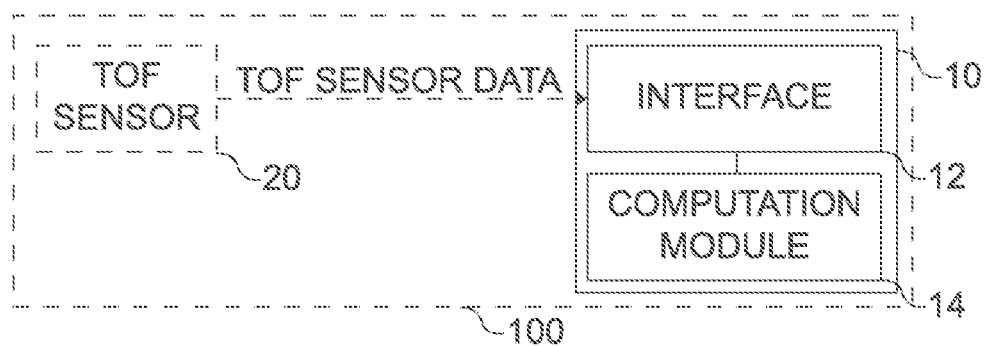
FIG. 1c shows a block diagram of an embodiment of an apparatus for determining distance information based on Time of Flight sensor data.

FIG. 1c shows a block diagram of an embodiment of an (corresponding) apparatus 10 for determining distance information based on Time of Flight (ToF) sensor data. The apparatus 10 comprises an interface 12 for obtaining the ToF sensor data. The apparatus 10 comprises a computation module 14 that is coupled with the interface 12. The computation module 14 is configured to determine one or more saturated regions within the ToF sensor data. The computation module 14 is configured to determine distance information for one or more boundary regions located adjacent to the one or more saturated regions based on the ToF sensor data. The computation module 14 is configured to determine distance information for at least a part of the one or more saturated regions based on the distance information of the one or more boundary regions. FIG. 1c further shows a Time of Flight sensor module 100, e.g. a ToF camera 100, comprising the apparatus 10 and a ToF sensor 20. The computation module 14 may be configured to obtain the ToF sensor data from the ToF sensor 20 via the interface 12. The ToF sensor module 100, e.g. the apparatus 10 or the computation module 14 of the ToF sensor module may be configured to execute the method introduced in connection with FIGS. 1a and 1b, e.g. in conjunction with the interface 12.

The following description may relate to the method of FIGS. 1a or 1b and/or to the apparatus 10 or Time of Flight sensor module 100 of FIG. 1c.

The method is directed on the determination of distance information. In this context, distance information may comprise a distance measurement of the distance between a ToF sensor providing the ToF sensor data and one or more objects located in the vicinity of the ToF sensor data. For example, the distance information may be represented by a distance image, a distance map or by a point cloud. Similar to a "normal" camera sensor, the ToF sensor may provide the ToF sensor data using a two-dimensional grid of pixels. The ToF sensor data may be represented by a plurality of pixels, e.g. a plurality of pixels arranged in a two-dimensional grid. Pixels of the two-dimensional grid of pixels may each indicate an amplitude/intensity of the light incident to the pixel and distance of the measured object to the ToF sensor that is measured based on the incident light. The amplitude/distance image may be calculated by multiple phase measurements with different reference phases. During the determination of the distance information, the phase measurements may be an intermediate sensor output that is used to calculate the distance/intensity. As shown in the following, the phase measurements may be used to determine, whether a pixel in the ToF sensor data is saturated. The distance information may represent or indicate the distance of the measured one or more objects to the ToF sensor. In at least some examples, the distance information of the one or more saturated regions within the ToF sensor data may be replaced or supplanted by the determined distance information of at least a part of the one or more saturated regions.

The method comprises obtaining 110 the ToF sensor data. For example, the ToF sensor data may be obtained by reading out the ToF sensor data from a ToF sensor (e.g. a PMD imager) providing the ToF sensor data. In at least some examples, the ToF sensor 20 is configured to provide the ToF sensor data. For example, the ToF sensor data may comprise the amplitude and the distance information determined by the ToF sensor. In addition or alternatively, the ToF sensor data may comprise the phase measurements of the ToF Sensor data. If, for example, the method is executed by a ToF sensor module, the ToF sensor data may comprise at least one phase measurement of light incident to the ToF sensor for each pixel of the ToF sensor data, and the method may determine the distance information and the amplitude/intensity information based on the at least one phase measurement of light incident to the ToF sensor. The phase measurements may be an intermediate sensor output of the ToF sensor during measurement process, which may be utilized to calculate the distance information and/or the intensity/amplitude information. In some examples, e.g. if the method is executed in a post-processing of the ToF sensor data, the ToF sensor data may comprise the amplitude and the distance information determined by the ToF sensor, and an indication, whether a pixel of the ToF sensor data is saturated.

The method further comprises determining 120 the one or more saturated regions within the ToF sensor data. If the ToF sensor data comprises information, whether a pixel within the ToF sensor data is saturated, the determining 120 of the one or more saturated regions may comprise detecting one or more continuous regions of saturated pixels within the ToF sensor data, and determining the one or more saturated regions based on the one or more continuous regions of saturated pixels. Otherwise, the method may additionally comprise determining which of the pixels are saturated.

If the method is executed by a ToF sensor module, the method may (additionally) comprise determining, whether a pixel within the ToF sensor data is saturated. In at least some examples, the amplitude/distance image is calculated by multiple phase-measurements with different reference phases. If a pixel is saturated in at least one of the phase-measurements, the amplitude/distance information of the pixel may be invalid. Saturated pixels of the single phase-measurement may be detected by checking whether the digitalized sensor readings are within the normal operating range. If the raw value of a pixel is outside of that range (e.g. close to the minimal or maximal limit), the pixel may be recognized as saturated and might not be used for valid amplitude/distance calculation.

In other words, the ToF sensor data may comprise at least one phase measurement of light incident to a ToF sensor for each of the plurality of pixels of the ToF sensor data. The phase measurement may be determined relative to at least one reference signal. A pixel of the plurality of pixels may be determined 120 to belong to a saturated region of the one or more saturated regions if the phase measurement of the pixel is outside a range of valid phase measurements. This may enable the detection of saturated regions within the raw ToF sensor data. For example, a pixel of the plurality of pixels may be determined 120 to belong to a saturated region of the one or more saturated regions if the phase measurement of the pixel is within a threshold of a maximal or minimal value of the phase measurement. In some examples, the ToF sensor data comprises two or more phase measurements of light incident to a ToF sensor for each of the plurality of pixels. The two or more phase measurements may be determined relative to two or more reference signals. A pixel of the plurality of pixels may be determined to belong to a saturated region of the one or more saturated regions if at least one of the two or more phase measurements of the pixel is outside a range of valid phase measurements. This may increase a reliability of the determination.

In at least some examples, as further shown in FIG. 1b, the method comprises identifying 130 the one or more boundary regions within the ToF sensor data. The one or more saturated regions may be caused by one or more objects. The one or more boundary regions may be based on stray light reflected off the one or more objects. In the ToF sensor data, the stray light may form a corona surrounding the one or more saturated regions. Consequently, the one or more boundary regions may be identified based to their proximity to the one or more saturated regions.

In at least some examples, the one or more boundary regions are identified 130 based on a proximity of the one or more boundary regions to the one or more saturated regions within the ToF sensor data, e.g. based on a proximity in pixel positions of the one or more boundary regions to the one or more saturated regions within the ToF sensor data. For example, pixels of the plurality of pixels that are located (directly) adjacent to a saturated pixel within the ToF sensor data (and are not themselves saturated) may be identified to belong to the one or more boundary regions. Another criterion is the amplitude (i.e. intensity) of the pixels. For example, the ToF sensor data may be based on a sensing of light incident to a ToF sensor. The one or more boundary regions may be identified 130 based on an intensity of the sensed light of the one or more boundary regions within the ToF sensor data. For example, the one or more boundary regions may be identified 130 if an intensity of the sensed light of the one or more boundary regions is within an intensity range that is indicative of stray light. Alternatively or additionally, the one or more boundary regions may be identified 130 based on an intensity differential of the sensed light between the one or more boundary regions and adjacent regions within the ToF sensor data. For example, an intensity value of the sensed light within the adjacent regions, e.g. further regions within the ToF sensor data, that are not saturated or caused by stray light, may differ by more than 20% of the intensity value of the sensed light from an intensity value of pixels located within the adjacent regions.

A further point to consider is the extent (i.e. "width") of the one or more boundary regions. In a basic example, the extent of the one or more boundary regions may be arbitrarily set to a given number of pixel(s), such as 1 pixel, i.e. the pixels that are located directly adjacent to the one or more saturated regions may correspond to the one or more boundary regions. This may enable a simple determination of the one or more boundary regions, but may be susceptible to inaccuracies, which may be smoothed out if the extent of the one or more boundary regions is chosen to be wider. For example, as shown in FIG. 1b an extent of the one or more boundary regions may be determined 132 based on a distance differential and/or based on an intensity differential between the one or more boundary regions and adjacent regions within the ToF sensor data. For example, if a distance of pixels that are located adjacent to pixels comprised in a boundary region of the one or more boundary regions, is different by at least a threshold value, e.g. by at least 10 cm, the extent of the one or more boundary region may be determined such, that the pixels that are located adjacent to the pixels comprised in the boundary region are excluded from the one or more boundary regions, e.g. in an iterative or recurrent fashion, starting from the pixels located directly adjacent to the one or more saturated regions. The intensity values of the pixels may be considered similarly. For example, if an intensity value of pixels that are located adjacent to pixels comprised in a boundary region of the one or more boundary regions, is different by at least a threshold value, e.g. by at least 10% of the intensity value of the pixels comprised in the boundary region, the extent of the one or more boundary region may be determined such, that the pixels that are located adjacent to the pixels comprised in the boundary region are excluded from the one or more boundary regions. This may enable the determination of the actual extent of the one or more boundary regions and may thus enable a more precise determination of the distance information of the one or more boundary regions.

The method further comprises determining 140 the distance information for the one or more boundary regions located adjacent to the one or more saturated regions based on the ToF sensor data. In some examples, e.g. if the method is executed by a ToF sensor module, the determining 140 of the distance information or the one or more boundary regions may be based on the least one phase measurement of light incident to the ToF sensor for each pixel of the ToF sensor data comprised in the one or more boundary regions. Alternatively, e.g. if the distance information of the one or more boundary regions is determined 140 in post-processing, the determining 140 of the distance information for the one or more boundary regions may comprise extracting the distance information of the one or more boundary regions from the ToF sensor data.

Finally, the method comprises determining 150 distance information for at least a part of the one or more saturated regions based on the distance information of the one or more boundary regions. As the ToF sensor data might not comprise valid distance information for the one or more saturated regions, the determining 150 of the distance information for at least a part of the one or more saturated regions may correspond to an arbitrary attribution or estimation of the distance information for at least a part of the one or more saturated region. In at least some examples, the distance information for at least a part of the one or more saturated regions may be determined (i.e. estimated or arbitrarily attributed) using an interpolation of the distance information of the one or more boundary regions.

In at least some examples, the one or more boundary regions may at least partially surround the one or more saturated regions. Distance information of pixels of a boundary region located at opposite ends of a saturated region that is at least partially surrounded by the boundary region may be used to interpolate (e.g. using bilinear interpolation) the distance information of at least part of the saturated region. In other words, the distance information for at least part of the one or more saturated regions may be determined 150 by interpolating the distance information for at least part of the one or more saturated regions based on the distance information of the one or more boundary regions, e.g. using bilinear interpolation. This may enable an estimation of the distance information for at least part of the one or more saturated regions. In some examples, a bilinear interpolation may be used, based on two pairs of pixels located on opposite sides of a saturated region (i.e. pairwise opposite, such that straight lines that connect the pixels of the pairs in a two-dimensional representation of the ToF sensor data intersect at the pixel of the saturated region, for which the distance information is determined). In a computationally advanced example, the interpolation may be based on three-dimensional plane fitting of at least part of the one or more saturated regions based on the distance information of the one or more boundary regions. This may enable a more precise determination of the distance information of the one or more saturated regions.

In some examples, as further shown in FIG. 1b, the method comprises discarding 160 the distance information of the one or more boundary regions. This may be desired as the distance information of the one or more boundary regions may originate from the stray light reflected off the objects that cause the one or more saturated regions and might not reflect the actual distance at these regions of the ToF sensor data. Instead, the boundary regions may hold distance information for the adjacent saturated regions. They might not represent the distance for the containing pixel but might hold the right distance values of the saturated regions at the wrong pixel position. At least some examples are based on using the out-of-place distance information to determine the distance information for the saturated regions. In an example, the points of the one or more boundary regions may be removed from the point cloud and/or the distance information of the pixels comprised by the one or more boundary regions within the ToF sensor data may be marked as invalid, e.g. by setting a confidence value of the pixels to zero.

The interface 12 may correspond to one or more inputs and/or outputs for receiving and/or transmitting information, which may be in digital (bit) values according to a specified code, within a module, between modules or between modules of different entities.

In embodiments, the computation module 14 may be implemented using one or more processing units or computation units, one or more processing devices or computation devices, any means for computing, such as a processor, a computer or a programmable hardware component being operable with accordingly adapted software. In other words, the described function of the computation module 14 may as well be implemented in software, which is then executed on one or more programmable hardware components. Such hardware components may comprise a general purpose processor, a Digital Signal Processor (DSP), a micro-controller, etc.

The Time of Flight sensor 20 may comprise at least one pixel element, e.g. a photonic mixing device (PMD) or be at least part of an image sensor circuit, for example, and may include a pixel sensor array, e.g. an array of pixel elements, for example. Each pixel element of the pixel array may be configured to receive reflected modulated light, which may be emitted by a time of flight light source and reflected by an object, for example. The ToF sensor 20 may be configured to provide the ToF sensor data comprising the plurality of pixels based on phase measurements obtained by the array of pixel elements. In some examples, the ToF sensor module may further comprise a ToF light source configured to provide the modulated light.

More details and aspects of the method and/or apparatus are mentioned in connection with the proposed concept or one or more examples described above or below (e.g. FIGS. 2a to 2c). The method and/or apparatus may comprise one or more additional optional features corresponding to one or more aspects of the proposed concept or one or more examples described above or below.

At least some embodiments relate to an approximation of saturated areas in time-of-flight images. Saturated pixels in ToF images may cause invalid distance values. In certain applications (e.g. object detection) it may be crucial to detect objects. In such applications, invalid areas in the distance image may cause these applications to fail. Saturated pixels are invalid pixels and are often discarded. A saturated pixel state may be detected, and the corresponding distance values can be marked as invalid.

These "holes" in the distance image may cause problems since they cannot be directly assigned with a distance value. The distance of the area in the hole might be completely unknown and thus may correspond to problems in certain applications. These holes might also occur with highly reflective or close objects at the lowest possible exposure time of a ToF sensor, e.g. with retroreflectors in signs, street signs, objects, that are too close, or glasses for face recognition.

Since saturated pixels are often caused by too much light arriving at the sensor, a significant amount of stray-light may occur around the object reflecting a lot of light. This stray-light may enable valid distance measurements of the saturated area.

Figure 2A:
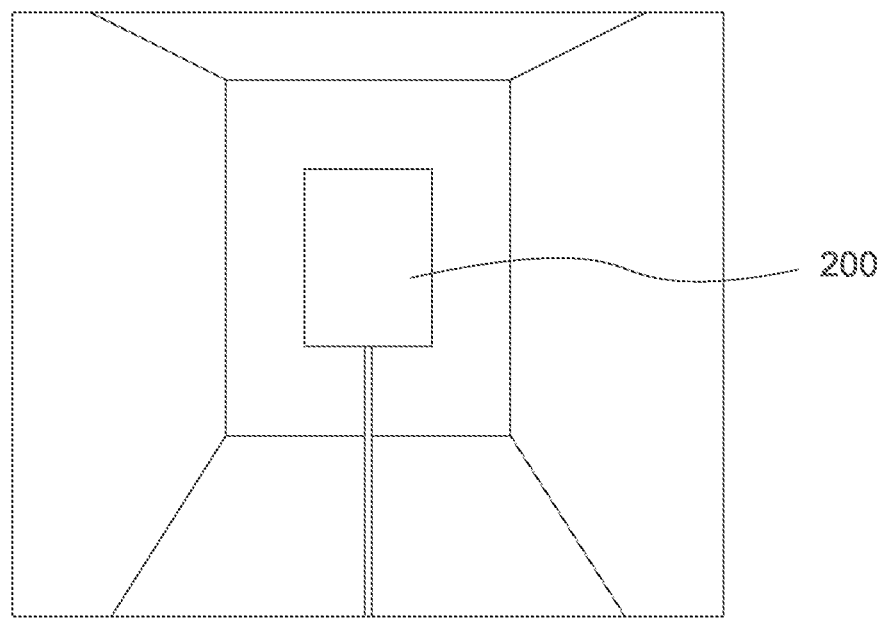
FIGS. 2a to 2c show schematic illustrations of measurements taken in an experimental setup.
Figure 2B:
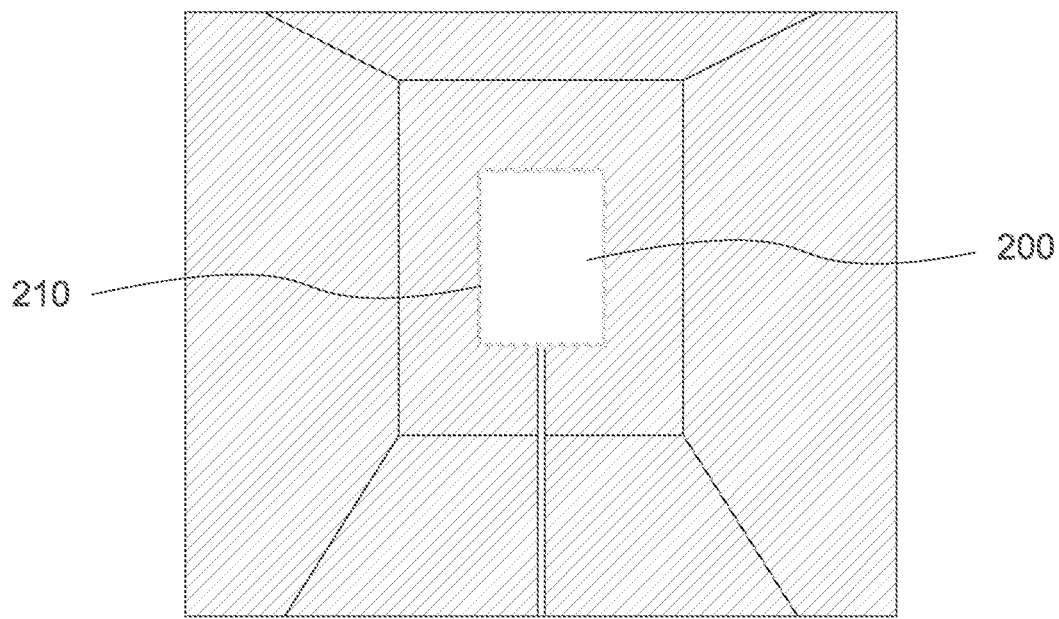
Figure 2C:
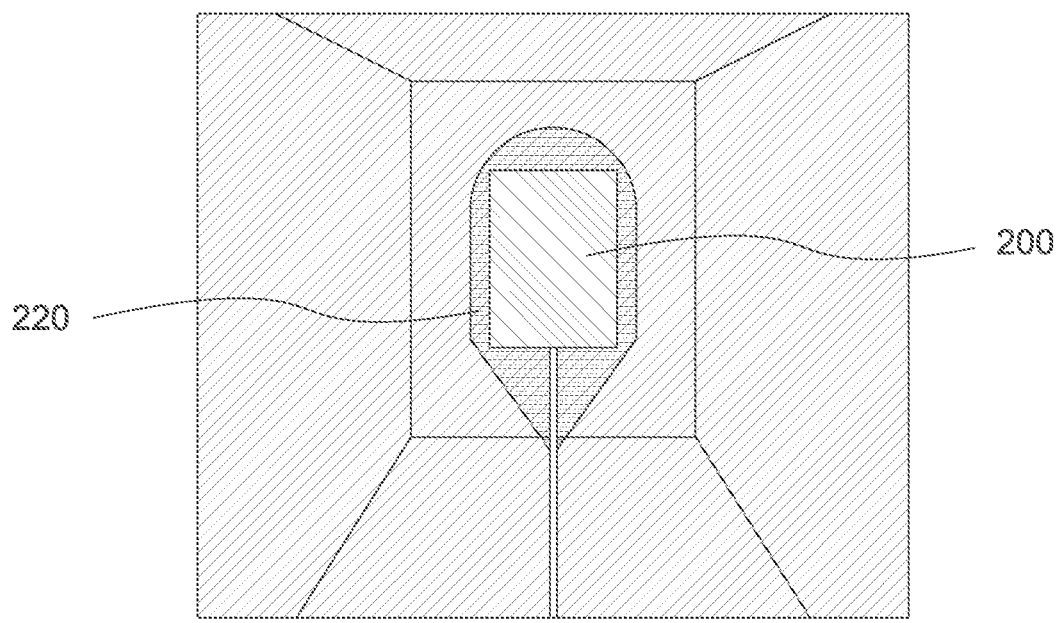

FIGS. 2a to 2c show schematic illustrations of measurements taken in an experimental setup. In FIG. 2a, the exemplary experimental setup is laid out. A uniform reflective surface 200, e.g. a piece of white cardboard, is attached to a pedestal and arranged in a room. In the experimental setup, the piece of cardboard is arranged too close (for the used exposure time) to a ToF camera that is used to determine distance information of the room with the piece of cardboard. FIGS. 2b and 2c show schematic representations of the amplitude image and distance image (e.g. of the ToF sensor data) that is recorded of the setup by a ToF sensor. The piece of cardboard causes a saturated region within the ToF sensor data. In the case of the distance image, a corona (scattered light) 220 is visible around the piece of cardboard 200. The distance image shown in FIG. 2c comprises no valid distance information for the piece of cardboard. In the amplitude image illustrated in FIG. 2b, a small corona 210 is also visible around the piece of cardboard. In an exemplary measurement that was performed based on this setup, the amplitude of the piece of cardboard (the saturated region within the ToF sensor data) was markedly higher than that of the rest of the room, with the boundary region 210 surrounding the piece of cardboard being slightly lower (but still markedly higher than that of the rest of the room).

Figure 3:
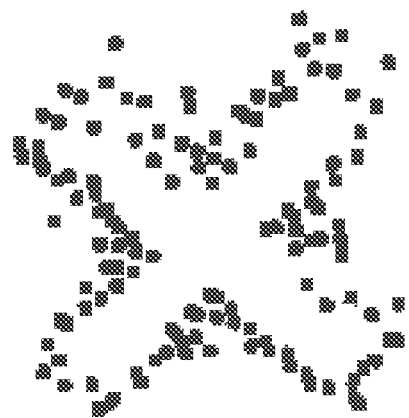
FIG. 3 shows an excerpt of a point cloud of a measurement taken in a further experimental setup.

FIG. 3 shows an excerpt of a point cloud of a measurement taken in a further experimental setup. In this example, an X-shaped reflector is attached to a box and positioned some way from the ToF sensor. In the amplitude image, the region of the ToF sensor data representing the X-shaped reflector is saturated, while the remainder of the box is barely visible. As shown in the point cloud of FIG. 3, in contrast to the remainder of the box that has the same distance from the ToF sensor, the stray light reflected off the X-shaped reflector yields distance information, which may be used to determine the distance information of the saturated region corresponding to the X-shaped reflector.

At least some embodiments may replace the invalid pixel area (e.g. the piece of cardboard in the above example, or, more general, the one or more saturated regions) with the interpolated distance values from the surrounding stray-light. Embodiments may replace the saturated pixel with the surrounding valid depth data. In some embodiments, the saturated area may be interpolated by 3D Plane Fitting using the surrounding stray light pixels as basis.

Especially small objects may be replaced by the interpolation of the corresponding stray-light.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for determining distance information based on Time of Flight (ToF) sensor data, the method comprising:
    obtaining the ToF sensor data, wherein the ToF sensor data is based on a sensing of light incident to a ToF sensor;
    determining one or more saturated regions within the ToF sensor data;
    identifying one or more boundary regions located adjacent to the one or more saturated regions within the ToF sensor data, based on an intensity of the sensed light of the one or more boundary regions within the ToF sensor data;
    determining an extent of the one or more boundary regions based on an intensity differential between the one or more boundary regions and adjacent regions within the ToF sensor data;
    determining distance information for the one or more boundary regions based on the ToF sensor data and taking into account the extent of the one or more boundary regions; and
    determining distance information for at least a part of the one or more saturated regions based on the distance information of the one or more boundary regions.

2. The method of claim 1, wherein determining the extent of the one or more boundary regions is based on comparing an intensity differential between the one or more boundary regions and adjacent regions within the ToF sensor data to a threshold value.

3. The method of claim 2, wherein the method comprises determining the extent of one or more boundary regions so as to exclude, from the boundary region, pixels adjacent to the one or more boundary regions having intensity values or distance values that are different, by more than a threshold value, from neighboring pixels in the one or more boundary regions.

4. The method of claim 1, wherein the distance information for at least part of the one or more saturated regions is determined by interpolating the distance information for at least part of the one or more saturated regions based on the distance information of the one or more boundary regions.

5. The method of claim 4, wherein the interpolation is based on three-dimensional plane fitting of at least part of the one or more saturated regions based on the distance information of the one or more boundary regions.

6. The method of claim 1, further comprising removing points corresponding to the one or more boundary regions from a point cloud.

7. The method of claim 1, wherein the one or more saturated regions are caused by one or more objects, and wherein the one or more boundary regions are based on stray light reflected off the one or more objects.

8. The method of claim 1, wherein the ToF sensor data is represented by a plurality of pixels, wherein the ToF sensor data comprises at least one phase measurement of light incident to a ToF sensor for each of the plurality of pixels, wherein the phase measurement is determined relative to at least one reference signal, and wherein a pixel of the plurality of pixels is determined to belong to a saturated region of the one or more saturated regions if the phase measurement of the pixel is outside a range of valid phase measurements.

9. The method of claim 8, wherein the ToF sensor data comprises two or more phase measurements of light incident to a ToF sensor for each of the plurality of pixels, wherein two or more phase measurements are determined relative to two or more reference signals, and wherein a pixel of the plurality of pixels is determined to belong to a saturated region of the one or more saturated regions if at least one of the two or more phase measurements of the pixel is outside a range of valid phase measurements.

10. A non-transitory computer readable medium having computer readable program code embodied therein, the computer readable program code being configured to implement the method of claim 1, when being loaded on a computer, a processor, or a programmable hardware component.

11. An apparatus for determining distance information based on Time of Flight (ToF) sensor data, the apparatus comprising:
    an interface circuit configured to obtain the ToF sensor data, wherein the ToF sensor data is based on a sensing of light incident to a ToF sensor; and
    a processing circuit configured to:
    determine one or more saturated regions within the ToF sensor data;
    identify one or more boundary regions located adjacent to the one or more saturated regions within the ToF sensor data, based on an intensity of the sensed light of the one or more boundary regions within the ToF sensor data;
    determine an extent of the one or more boundary regions based on an intensity differential between the one or more boundary regions and adjacent regions within the ToF sensor data;
    determine distance information for the one or more boundary regions based on the ToF sensor data and taking into account the extent of the one or more boundary regions; and
    determine distance information for at least a part of the one or more saturated regions based on the distance information of the one or more boundary regions.

12. A Time-of-Flight (ToF) sensor module comprising a ToF sensor and the apparatus of claim 11, wherein the ToF sensor is configured to provide the ToF sensor data, and wherein the computation module processing circuit is configured to obtain the ToF sensor data from the ToF sensor via the interface circuit.

13. The apparatus of claim 11, wherein the processing circuit is configured to determine the extent of the one or more boundary regions based on comparing an intensity differential between the one or more boundary regions and adjacent regions within the ToF sensor data to a threshold value.

14. The apparatus of claim 13, wherein the processing circuit is configured to determine the extent of one or more boundary regions so as to exclude, from the boundary region, pixels adjacent to the one or more boundary regions having intensity values or distance values that are different, by more than a threshold value, from neighboring pixels in the one or more boundary regions.

15. A method for determining distance information based on Time of Flight (ToF) sensor data, the method comprising:
   obtaining the ToF sensor data, wherein the ToF sensor data is based on a sensing of light incident to a ToF sensor;
   determining one or more saturated regions within the ToF sensor data;
   identifying one or more boundary regions located adjacent to the one or more saturated regions within the ToF sensor data, based on an intensity of the sensed light of the one or more boundary regions within the ToF sensor data;
   determining a width of each of the one or more boundary regions based on an intensity differential between the one or more boundary regions and adjacent regions within the ToF sensor data;
   determining distance information for the one or more boundary regions based on the ToF sensor data and taking into account the width of the one or more boundary regions; and
   determining distance information for at least a part of the one or more saturated regions based on the distance information of the one or more boundary regions.

16. The method of claim 15, wherein determining the width of the one or more boundary regions is based on comparing an intensity differential between the one or more boundary regions and adjacent regions within the ToF sensor data to a threshold value.

17. The method of claim 15, wherein the distance information for at least part of the one or more saturated regions is determined by interpolating the distance information for at least part of the one or more saturated regions based on the distance information of the one or more boundary regions.

18. The method of claim 17, wherein the interpolation is based on three-dimensional plane fitting of at least part of the one or more saturated regions based on the distance information of the one or more boundary regions.

19. The method of claim 15, further comprising removing points corresponding to the one or more boundary regions from a point cloud.

20. The method of claim 15, wherein the ToF sensor data is represented by a plurality of pixels, wherein the ToF sensor data comprises at least one phase measurement of light incident to a ToF sensor for each of the plurality of pixels, wherein the phase measurement is determined relative to at least one reference signal, and wherein a pixel of the plurality of pixels is determined to belong to a saturated region of the one or more saturated regions if the phase measurement of the pixel is outside a range of valid phase measurements.

* * * * *